United States Patent
Rauch

[11] Patent Number: 6,119,443
[45] Date of Patent: Sep. 19, 2000

[54] CORN HARVESTING ATTACHMENT

[75] Inventor: Hans Rauch, Saulgau, Germany

[73] Assignee: CLAAS Saulgau GmbH, Saulgau, Germany

[21] Appl. No.: 09/133,232

[22] Filed: Aug. 13, 1998

[30] Foreign Application Priority Data

Aug. 12, 1997 [DE] Germany ............................ 197 34 747

[51] Int. Cl.$^7$ ................................................. A01D 45/02
[52] U.S. Cl. ...................................... 56/64; 56/94; 56/119
[58] Field of Search ................................. 56/53, 60, 94, 56/95, 98, 101, 102, 119, 64, 103

[56] References Cited

U.S. PATENT DOCUMENTS

| | | | |
|---|---|---|---|
| 1,901,099 | 3/1933 | Hale | 56/102 |
| 4,594,842 | 6/1986 | Wolters et al. | 56/94 |
| 5,237,804 | 8/1993 | Bertling | 56/60 |
| 5,651,243 | 7/1997 | Arnold et al. | 56/94 |
| 5,661,964 | 9/1997 | Paulson et al. | 56/64 |
| 5,722,225 | 3/1998 | Wuebbels et al. | 56/60 |

FOREIGN PATENT DOCUMENTS

| | | | |
|---|---|---|---|
| 0 712 567 A1 | 10/1995 | European Pat. Off. | A01D 45/02 |
| 30 29 424 C2 | 8/1980 | Germany | A01D 45/02 |
| 33 08 077 A1 | 3/1983 | Germany | A01D 45/02 |
| 34 14 576 C2 | 4/1984 | Germany | A01D 45/00 |
| 31 15 723 C2 | 5/1985 | Germany . | |
| 36 23 380 C2 | 7/1986 | Germany | A01D 45/02 |
| 37 12 507 C1 | 4/1987 | Germany | A01D 45/02 |
| 40 02 344 C2 | 8/1991 | Germany | A01D 45/02 |
| 42 01 067 A1 | 1/1992 | Germany | A01D 45/02 |
| 195 28 817 A1 | 8/1995 | Germany | A01D 45/02 |
| 895329 | 1/1982 | U.S.S.R. | 56/64 |
| 1056950 | 11/1983 | U.S.S.R. | 56/103 |
| 144068 | 4/1992 | U.S.S.R. | 56/103 |

*Primary Examiner*—Eileen Dunn Lillis
*Assistant Examiner*—Gary S. Hartmann
*Attorney, Agent, or Firm*—Husch & Eppenberger, LLC; Robert E. Muir

[57] ABSTRACT

A corn harvesting attachment for attachment to a self-propelled harvesting machine such as e.g. a combine harvester is described, which can cut independently of the rows and pick the corn ears off the stalks in order to process them separately from the rest of the plants, for example thresh them out. Picking units are associated with the individual feed regions of the cutter bar, which comprise large conveying discs provided with edge recesses. The cut-off whole plants, which are picked upright, are transferred to the picking units either by means of clearing discs or by the fact that the receiving sections of the picking units enter the circle in which the conveying discs move.

12 Claims, 3 Drawing Sheets

CORN HARVESTING ATTACHMENT

BACKGROUND OF THE INVENTION

This invention relates generally to the field of agricultural machinery, and particularly to improvements in corn harvesting attachments to self-propelled harvesting machines.

A corn harvester or a combine generally includes feed channels that cut off and draw in plants which stand to some extent in front of the feed channel mouth in the direction of harvester travel. In order for such a harvesting device to function correctly, the lateral distance between the feed channels must match the distance between the plant rows fairly precisely. German patent 3 029 424 C2 describes such a device.

The device described in European Patent 0 712 567 is a field chopper that includes a cutting and feeding device that finely chops the entire corn plant and does not require plants in rows matching the feed channel mouth lateral spacing to operate correctly. Instead, the device includes several tandem conveying discs arranged coaxially at a distance from each other, which have special recesses or teeth regularly distributed over the circumference. Under each tandem disc rotates at higher speed a bladed disc which cuts the corn stalks off just above the ground which are then picked up by the recesses of the conveying disc during the harvester traveling motion. The plants then move essentially upright along the circumference of the conveying discs to the feed region of this device which is the wedge shaped region formed between adjacent conveying discs.

It would be desirable to overcome the limitation of current corn harvesters which require corn to be planted in precisely spaced rows. It is also desirable to process ears of corn separately from the rest of the plant which at present is a capability held only by harvesters requiring corn to be planted in precise rows An object of the invention is to provide a corn harvesting attachment which can cut stalks independently of rows (i.e. without regard to rows) and pick the corn cobs and transport them on separately from the remaining plant parts.

SUMMARY OF THE INVENTION

In accordance with the present invention there is provided a self-propelled harvesting machine including a stalk cutter bar at the front of the machine arranged to cut corn stalks independently of the rows of corn; and a plurality of picking units mounted behind the stalk cutter bar for separating the corn ears from the stalks and for further processing.

Corn ear picking units are mounted behind a stalk cutter bar of the kind described hereinbefore. The cutter bar has bladed discs rotating about vertical axes and, located coaxially above them, toothed conveying discs, in particular tandem discs, which convey the separated plants in an upright position to individual feed regions, and with each feed region is associated a picking unit. Equipment arrangements are possible where each conveying disc feeds a picking unit or where two conveying discs feed a single picking unit with a corresponding reduction in the number of required picking units.

Clearing discs are provided to release stalks which have been pressed into the edge recesses of the conveying discs. Clearing discs are smaller diameter toothed discs mounted either above or below the conveying discs or in tandem discs in such a way that their rim intersects the rim of the conveying discs at approximately a right angle. In the preferred embodiment each conveying disc has an associated clearing disc which acts as an intermediate conveyor of crop material delivered by the conveying disc to a picking unit. Intermediate-conveying clearing discs allow the picking unit to be oriented obliquely or even transversely to the direction of harvester machine travel and thereby shorten the attachment and improve machine stability.

One arrangement of the picking units has two picking rollers which are mounted beneath the picking gap and whose front sections are constructed as feed tips. The use of two counterrotating conveying discs supplying a common picking unit allows picking roller feed tips that are extended tangentially into the conveying disc circle to act as clearing devices with for their associated conveying discs. In an alternate arrangement where a single conveying disc works on a picking unit, only one of the two feed tips will enter the conveying disc circle of movement and act as a clearing device, while the other feed tip is located outside the circle. In another alternate arrangement, the picking units are provided with a single picking roller that cooperates with a fixed structure such as a partial casing of the picking roller.

Picking units are designed in such a way as to actively draw in corn stalks with attached ears. One embodiment to draw in crop material uses conical rotating feed tips provided with corkscrew-like spirals. A picking unit of this configuration can take the place of a clearing disc by entering the circle in which the associated conveying disc moves and acting as a clearing device.

The picking units usually each have a picking gap formed between two interior edges. The gap is sized so that the stalks and leaves of the corn plant are able to pass through but any attached ears are pulled off of the stalk.

To ensure movement of crop material with as little hindrance as possible from the conveying discs to the picking gaps, the picking gaps extend approximately in the direction of a tangent to the circle in which the conveying discs or any provided clearing discs move.

The upper regions of the picking units are provided with one or more endless conveying chains or alternatively, screw conveyors. These conveyors transport picked corn ears as well to pull corn stalks towards the picking unit gap.

After passing through the picking unit, stalks are ejected from the harvesting attachment. Comminuting devices are mounted in the ejection path to accelerate decomposition of the stalks and to reduce wear on soil cultivators. One such comminuting device involves a single picking roller of a picking unit provided with impact plates extending in an axial direction and which cooperate with blades fixed perpendicularly to the axis in order to comminute the stalks before downward ejection. Comminuting devices for the stalks pulled through the picking gap can also be provided beneath the picking units.

Picked ears are transported from the picking units to the center of the harvesting attachment and ultimately the harvesting machine by a transverse screw conveyor mounted in the rear of the attachment. If the picking units are arranged in the direction of travel or obliquely thereto, it will not be a problem to eject the ears into the conveying trough. In harvesting attachment configurations that use transversely mounted the picking units, an additional intermediate conveying device can be provided to move picked ears from the picking units to the transverse screw conveyor in the rear of the attachment.

BRIEF DESCRIPTION OF THE DRAWINGS

Reference is now made to the drawings which illustrate a preferred embodiment of the invention and wherein the same numerals indicate the same parts throughout the several views.

DETAILED DESCRIPTION

Figure 1:
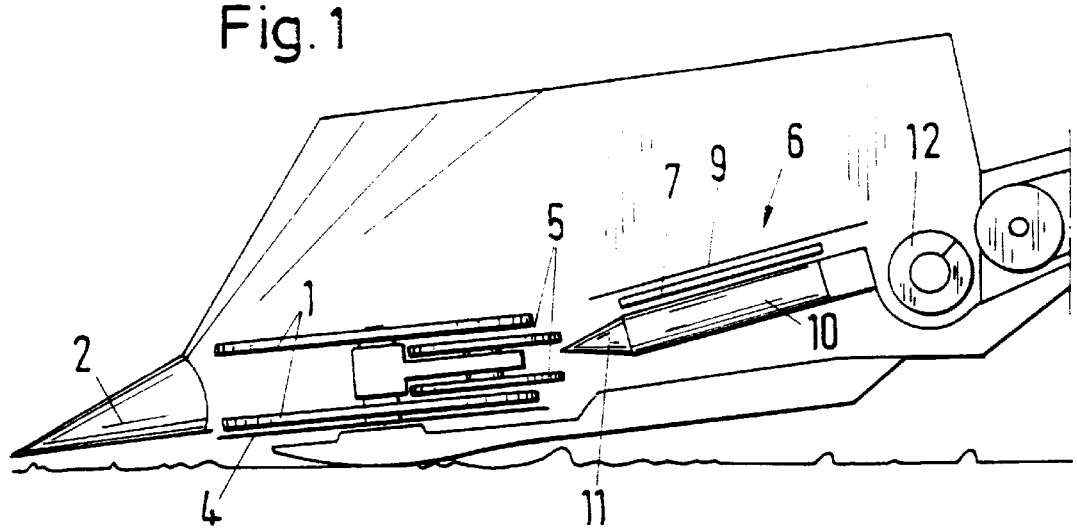
FIG. 1 is a side view of an attachment embodying the present invention.
Figure 2:
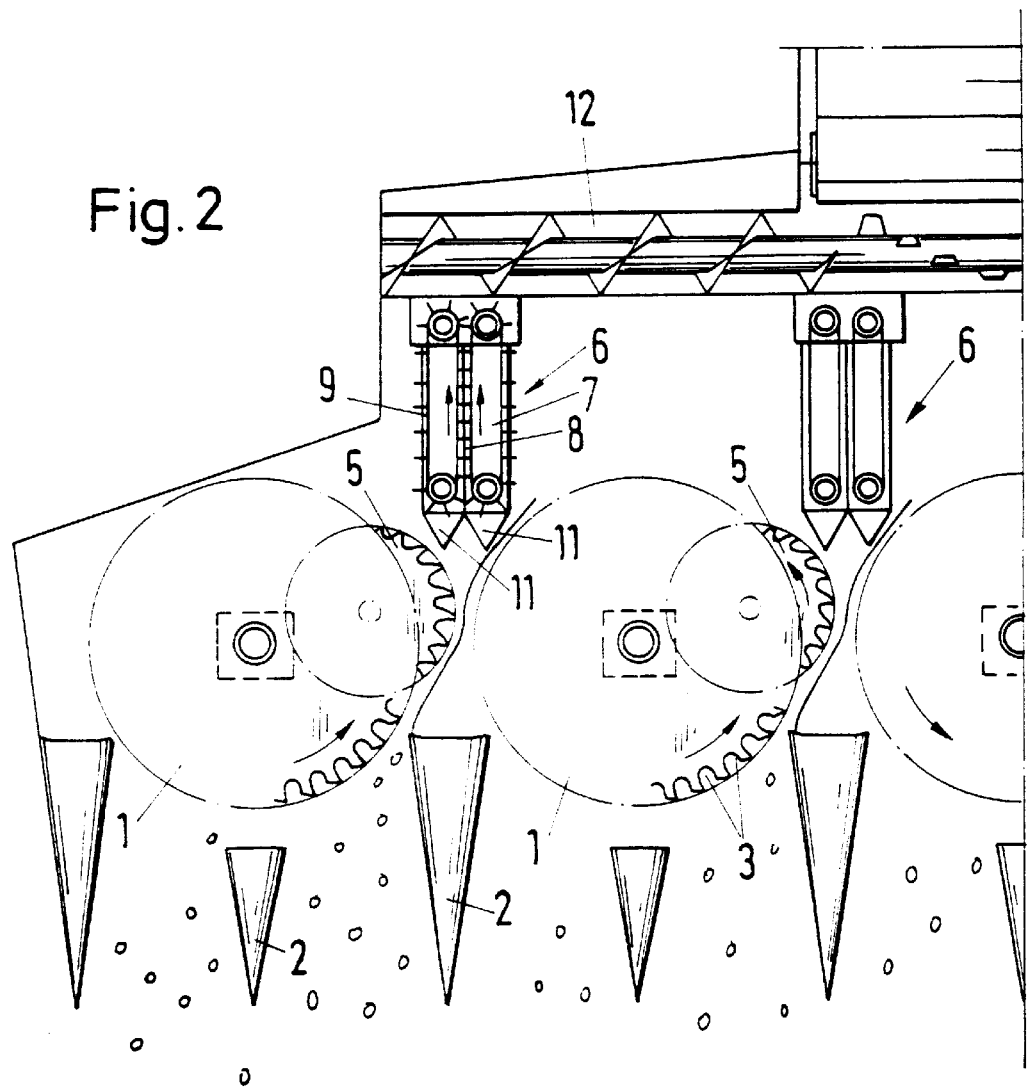
FIG. 2 is a top view of the left half of the attachment shown in FIG. 1 and illustrating conveying discs and an associated clearing disc and picking unit.

The attachment in FIGS. 1 and 2 has a total of five conveying discs 1 adjacent each other. The total working width is divided by stalk dividers 2 into ten working width sections, two to each conveying disc. As FIG. 1 shows, the conveying discs 1 are constructed as tandem discs which rotate about a common axis and are spaced apart from each other. At their edge the conveying discs comprise recesses 3 which are shaped in such a way that during entrainment they hold the corn stalks which are cut off by means of a coaxial bladed disc 4, but do not hinder clearance of the stalks. Between the conveying discs 1 two serrated clearing discs 5 coaxial with each other are mounted on a bearing arm in such a way that the circles in which they move intersect with the circles in which the conveying discs 1 move at an obtuse angle. The regions in which two adjacent conveying discs 1 come closest or the front and rear wedges formed by the conveying discs 1 form in each case together the feed regions of the cutter bar.

Behind each of the feed regions is a picking unit 6. It consists of two picking plates 7 which form between them a picking gap 8. Chain conveyors 9 are located above the picking units to transport the picked ears rearward. Under the picking plates 7 are mounted two parallel picking rollers 10 whose cylindrical roller body includes impact plates or similar fixtures and has a conical feed tip 11 with screw turns. The axis of the picking gap 8 is oriented in the direction of travel and is tangential to the clearing disc 5. In this way the stream of material travels exactly between the feed tips 11. The feed tips 11 convey the stalks further into the picking units until they are pulled downwards by the cylindrical roller bodies 10. The upper plant parts with the ears are simultaneously guided on by the chain conveyor 9 into the picking gap 8. Finally the chain conveyors take the picked ears on rearward until there they fall into the trough of a transverse screw conveyor 12. This conveys ears from both sides of the harvesting attachment to the center, where the harvested ears are then transferred to the harvesting machine.

Figure 3:
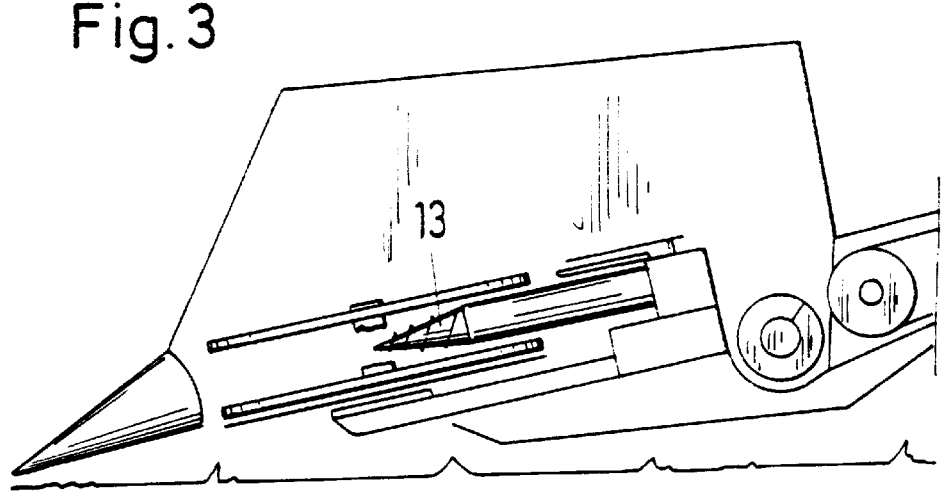
FIG. 3 is a side view of another embodiment.
Figure 4:
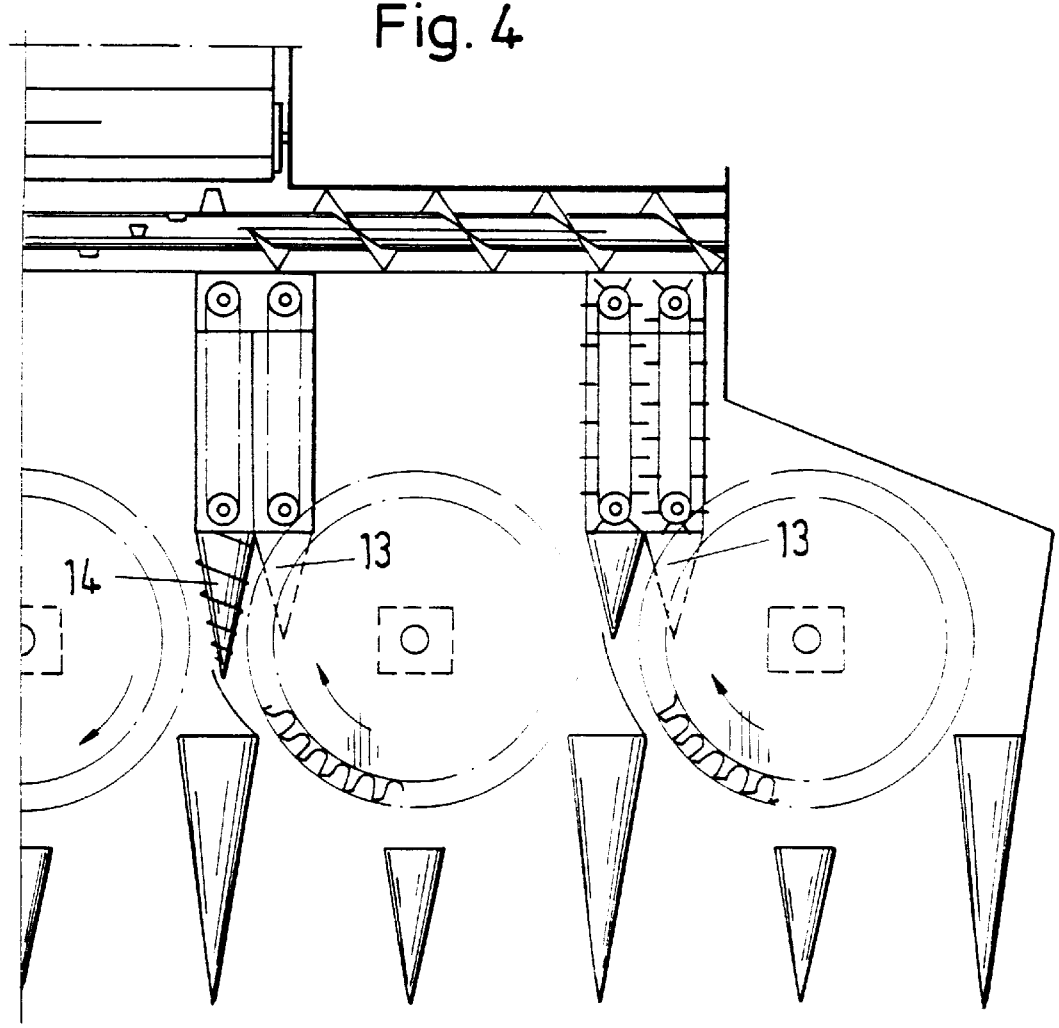
FIG. 4 is a top view of the other embodiment in which, instead of clearing discs, the feed tips of the picking units cause clearing of the conveying discs.

The embodiment according to FIGS. 3 and 4 differs from the preceding one in that no clearing discs are provided. Instead, one feed tip 13 from each picking unit extends into the circle in which the associated conveying disc 1 moves. This feed tip 13 acts as a clearing device. The side view according to FIG. 3 reveals that elevation of feed tip 13 enters at a level between the upper and lower conveying discs. The second feed tip 14 is mounted between the two conveying discs and is longer than the other feed tip of the same picking unit.

Figure 5:
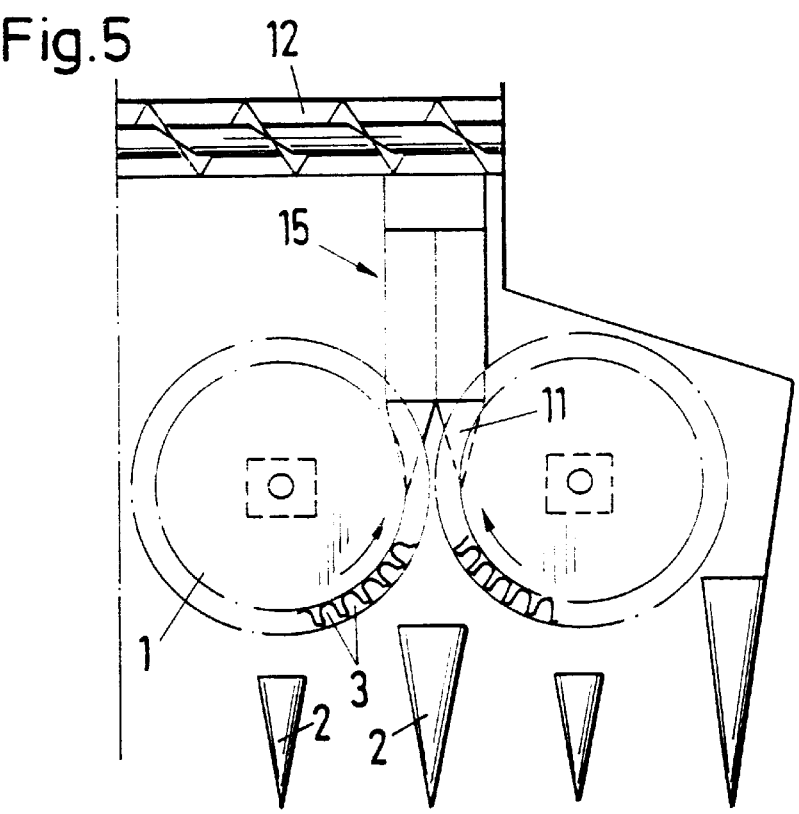
FIG. 5 is the right half a top view of a further embodiment in which two feed discs supply one picking unit.

The embodiment shown in FIG. 5 shows an arrangement of two counterrotating conveying discs 1. Counterrotating means in this case that the plants picked up at the front by the conveying discs 1 are conveyed as two converging streams of material into the wedge region. There the streams of material unite and are picked up and processed together by the picking unit 15. The two feed tips 11 enter the circle in which their respective conveying discs move. As the axes of the conveying discs are located exactly in a right-angled transverse plane, the picking gap extends exactly in the direction of harvester machine travel.

Figure 6:
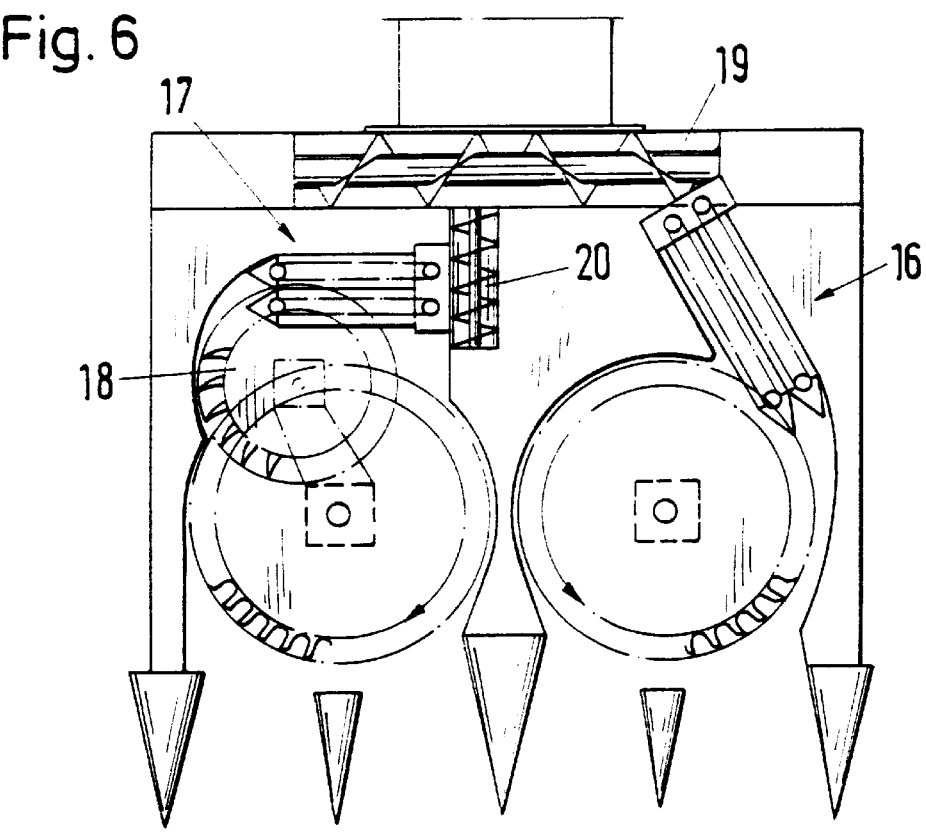
FIG. 6 is a top view showing two further embodiments, the picking unit being arranged obliquely to the direction of travel in the right half and the picking unit being arranged perpendicularly to the direction of travel in the left half thereof.

FIG. 6 shows two alternate embodiments with the centerline of the drawing delineating the different arrangements. In the right half of FIG. 6, a picking unit 16 is oriented obliquely to the direction of harvester machine travel. Transfer of the crop material corresponds to that according to FIG. 4, with the crop material being generally carried by the conveying disc through a longer arc before depositing the crop material to the picking unit. This arrangement allows the use of a shorter transverse screw conveyor can be shorter and reduces the length of the harvesting attachment.

In the left half of FIG. 6, a picking unit 1 7 is oriented perpendicular to the direction of harvester machine travel. A clearing disc 18 provided conveys in an arc between the feed tips of the picking unit. The picked ears are deposited into screw conveyor 20 for movement to transverse screw conveyor 19. This arrangement allows a reduction in the length of the harvesting machine. It is also possible that this embodiment could be further refined by eliminating screw conveyor 20 and replacing it with an ordinary chute.

I claim:

1. A self-propelled harvesting machine for harvesting corn, the machine comprising a front portion having a stalk cutter bar, the stalk cutter bar being arranged to cut corn stalks independently of corn rows and a plurality of picking units mounted behind the stalk cutter bar for separating corn ears from the stalks for further processing, the stalk cutter bar including rotatable toothed cutter discs mounted for rotation about vertical axes and a conveying disc located above each toothed cutter disc, the conveying discs conveying the separated stalks to individual feed regions and each feed region having a picking unit associated therewith, each picking unit acting as a clearing device in the feed region and extending into a circle in which an associated clearing disc moves.

2. A self-propelled harvesting machine according to claim 1, wherein located coaxially above each toothed cutter disc, is a conveying disc which conveys the separated stalks upright to an individual feed region.

3. A self-propelled harvesting machine according to claim 2, including a toothed clearing disc associated with each conveying disc for supplying the stalks delivered by the conveying disc to a picking unit; and each toothed clearing disc being mounted for rotation about an axis parallel to an axis on which the associated conveying disc is mounted.

4. A self-propelled harvesting machine according to claim 2, including said conveying discs wherein adjacent conveying, discs rotate in opposite directions; and, converging streams of material propelled by the conveying discs are picked up together by a picking unit mounted behind an input wedge of the conveying discs.

5. A self-propelled harvesting machine- according to claim 2, including said picking units; wherein picking gaps are arranged obliquely or transversely to the direction of corn travel behind the conveying discs and wherein the picking gaps are rectilinear in shape.

6. A self-propelled harvesting machine according to claim 1, wherein said picking units each comprise one picking roller.

7. A self-propelled harvesting machine according to claim 1, wherein said picking units include one or more conveyors located in an upper region of the picking units to transport corn ears or stalks protruding beyond a picking gap further toward the picking gap.

8. A self-propelled harvesting machine according to claim 1, including comminuting devices mounted beneath the picking units to act on stalks exiting the picking gaps.

9. A self-propelled harvesting machine according to claim 1, including a transverse screw conveyor; and, said transverse screw conveyor centering corn ears from the picking units for transfer to the harvesting machine through the conveyor.

10. A self-propelled harvesting machine for harvesting corn, the machine comprising a front portion having a stalk cutter bar, the stalk cutter bar being arranged to cut corn stalks independently of corn rows and a plurality of picking units mounted behind the stalk cutter bar for separating corn ears from the stalks for further processing, the stalk cutter bar including rotatable bladed toothed discs mounted for rotation about vertical axes for cutting corn stalks adjacent to ground attachment, the machine including conveying discs located coaxially above the bladed discs, the conveying discs conveying the cut corn stalks upright to individual feed regions, the machine further having picking units associated with said feed regions, and having a toothed clearing disc associated with each conveying disc for supplying the stalks delivered by the conveying discs to said picking unit, each toothed clearing disc being mounted for rotation about an axis parallel to an axis on which an associated conveying disc is mounted, the picking units each having a gap defined by inner edges of a picking unit, the picking unit inner edges forming a line substantially tangential to a circle in which move a conveying or clearing disc.

11. A self-propelled harvesting machine for harvesting corn, the machine comprising a front portion having a stalk cutter bar, the stalk cutter bar being arranged to cut corn stalks independently of corn rows and a plurality of picking units mounted behind the stalk cutter bar for separating corn ears from the stalks for further processing, the stalk cutter bar including rotatable bladed toothed disc mounted for rotation about vertical axes for cutting corn stalks adjacent to ground attachment, the machine including conveying discs located coaxially above the bladed toothed discs, the conveying discs conveying the cut corn stalks to individual feed regions, the machine further having picking units associated with said feed regions, each picking unit having a gap defined by picking unit inner edges and each picking unit having first and second picking rollers with conical feed tips, the picking rollers being mounted under a picking gap, and wherein the first picking roller conical feed tip tangentially enters a circle in which an associated conveying disc moves and the conical feed tip of the second picking roller does not enter the circle in which the associated conveying disc moves.

12. A self-propelled harvesting machine according to claim 11, wherein said conical feed tip located outside the circle in which the associated conveying disc moves is longer than the conical feed tip that enters the circle in which the associated conveying disk moves.

* * * * *